United States Patent [19]

Carr et al.

[11] Patent Number: 5,063,392

[45] Date of Patent: Nov. 5, 1991

[54] COLOR CHANGE SYSTEM FOR MULTICOLOR STRIP CHART RECORDERS

[75] Inventors: Daniel J. Carr, Harleysville; Charles R. Scally, Warminster; Bill M. McClennen, Harleysville; Michael D. Carney, Havertown; George Volkodav, North Wales; Thomas J. Walsh, Hatboro, all of Pa.

[73] Assignee: General Signal Corporation, Stamford, Conn.

[21] Appl. No.: 459,848

[22] Filed: Jan. 2, 1990

[51] Int. Cl.[5] .............................................. G01D 9/28

[52] U.S. Cl. ............................... 346/46; 346/33 TP; 400/124

[58] Field of Search ............ 346/46, 33 TD; 400/124, 400/216, 216.1, 216.2

[56] References Cited

U.S. PATENT DOCUMENTS

| | | | |
|---|---|---|---|
| 3,899,065 | 8/1975 | Brignole | 197/151 |
| 4,568,209 | 2/1986 | Zerillo | 400/216.1 |
| 4,643,601 | 2/1987 | Nash et al. | 400/216.1 |
| 4,654,672 | 3/1987 | Kimura et al. | 346/46 |
| 4,707,155 | 11/1987 | Burkhead et al. | 400/199 |

*Primary Examiner*—Benjamin R. Fuller

*Assistant Examiner*—Victor DeVito

*Attorney, Agent, or Firm*—William G. Miller, Jr.

[57] ABSTRACT

An improvement is provided for printer such as the dot matrix or thermal type, in which the printhead is stepped across the paper over a multicolor ribbon supplied from a pivotally mounted cartridge and transported through a plane between the line of traverse of the printhead and the surface of the paper. The ribbon is guided by guiding surfaces positioned on each side of the printhead, close to the printhead, and mounted to move with the printhead across the paper so that the guide surfaces will guide the path the ribbon takes to one which passes between the printhead and the paper with the guide being moveable in steps in a direction normal to the traverse of the printhead and parallel to the plane of the ribbon so as to position a selected color band of the ribbon under the printhead to select the color to be printed as the printhead traverses the paper. The ribbon cartridge is free to pivot in response to movement of the ribbon guide and/or the printhead so as to accommodate the different positions of the ribbon with respect to the printhead, as determined by the ribbon guide and the different positions of the printhead with respect to the paper.

7 Claims, 3 Drawing Sheets

FIG. 1
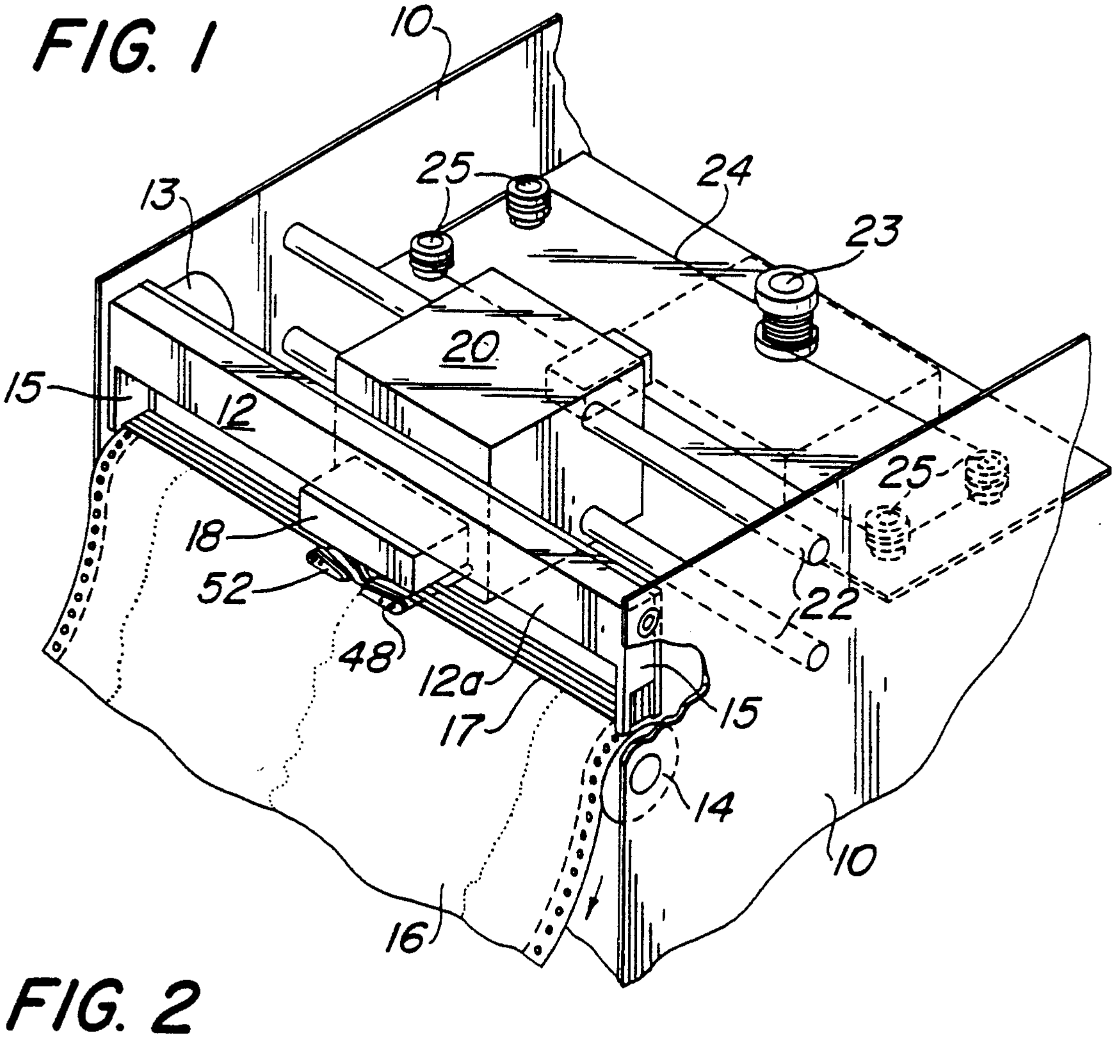
FIG. 2
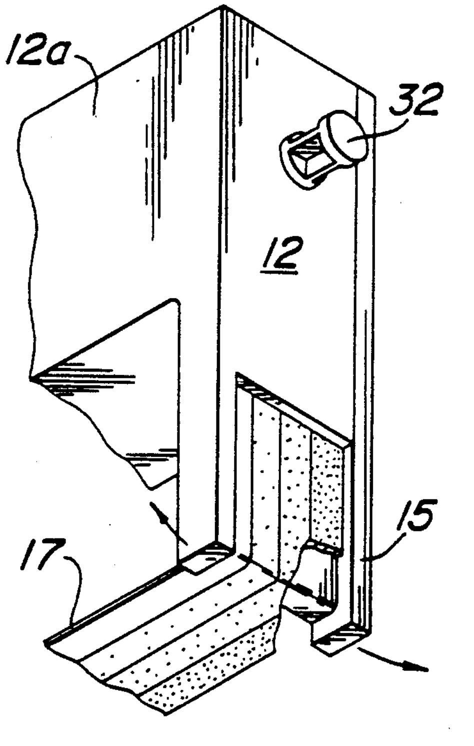
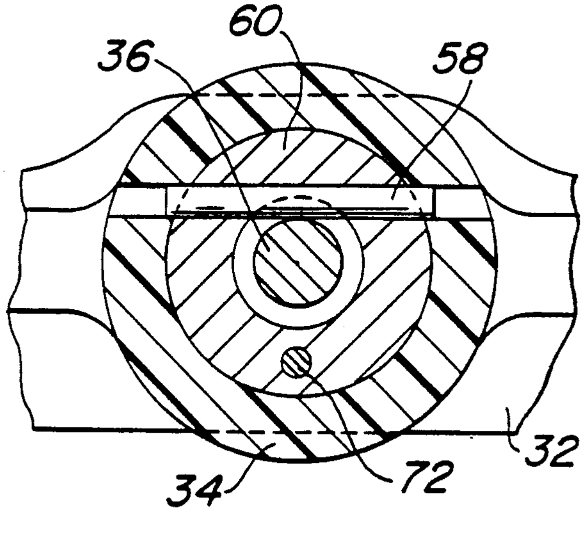
FIG. 6

COLOR CHANGE SYSTEM FOR MULTICOLOR STRIP CHART RECORDERS

BACKGROUND OF THE INVENTION

This invention relates to multicolor printing and is particularly useful in paper printers, such as strip chart recorders, which use registration elements which print through a ribbon onto paper. The printing may, for example, be carried out by an impact printhead, such as the dot matrix type, where a matrix of wires forms the impact elements or registration elements which provide for the impression of a multicolor record on the paper by the virtue of the registration accomplished by those elements through a multicolor inked ribbon. In recorders of this type the printhead is driven in traverse of the top of the chart drive roll or platen, and the multicolored inked ribbon is positioned in a plane parallel to the chart paper being printed on and between the line of traverse of the printhead and the plane of the chart paper. In recording or printing devices of this type, the multicolor ribbon is usually supplied in a disposable cartridge which has an endless ribbon with the majority of its length stored in a stuffing box, frequently elongated in shape, and having ribbon guiding arms projecting from its ends so that when the stuffing box is placed above and parallel to the line or plane of printhead travel the ribbon is guided through a plane parallel to the printhead travel and between the printhead and the chart paper.

In multicolor printing, when the printhead traverses the chart over a fixed path, it is necessary to selectively position the length of ribbon which spans the width of the chart, between the printhead path and the chart paper, in a manner so that the different color bands are selectively positioned under the printhead as needed for the printing of each color. Thus, the ribbon must be displaceable stepwise from a home position, in which the color in the band on an edge of the ribbon is printed, in a direction normal to the printhead path and in a plane parallel to the plane of the ribbon traversing the chart. This displacement must be carefully controlled in multiwire printheads in order to obtain proper registration. Thus, the wires or pins of the printhead must be positioned in each of the step positions so that the printhead will not print in two colors at the same time.

A prior art system which shows a multicolor printing recorder of the type described above is found in U.S. Pat. No. 4,654,672, issued on Mar. 31, 1987 to Kimura et al. In Kimura's strip chart recorder, as shown in FIG. 7, there is a ribbon cartridge which is mounted between two pivot points above the printhead with the ribbon following a path between the printhead and the paper. The cartridge has a sector gear mounted to it and that gear is driven so as to pivot the cartridge to thereby move the ribbon into the proper position for printing in each of the available colors. This particular system for moving the ribbon may be tolerated in a miniature recorder of the type shown in Kamura; for with a narrow chart, four or five inches, and with a printhead having a single wire as its impact element, the tolerance for the positioning of the ribbon is less stringent. With a multiple pin printhead, such as a nine pin head, and wider charts, such as 14 inches, the tolerance available for the positioning of the ribbon is considerably reduced. In other words, with a ribbon spanning 4 or 5 inches, it may be possible to move it with suitable accuracy by pivoting the ribbon cartridge, particularly when only one wire is used; whereas, with a ribbon of 14 inch length, it would not be easily moved with adequate accuracy using the same pivoting arrangement, particularly when multiple wires must be in registration with a single color band.

Still another method which has been used in printers for positioning a two color ribbon involves a solenoid actuated guide which has two positions corresponding to energization and deenergization of the solenoid and with a fixed ribbon supply rather than a pivoted cartridge. Such a system, of course, is not useful when more than two colors are involved, or when the space between the limit positions of the printhead as it traverses the paper and the fixed points of the ribbon support are close, for under those conditions the distortion of the normal path of the ribbon is too large for suitable operation to occur.

It is an object of this invention to provide a simple yet accurate positioning system for the ribbons of multicolor printers so that ribbon positioning, where more than one color is involved will be to closer tolerances than heretofore attainable and so that it is possible to have the limit positions of the printhead, as it traverses the paper, come closer to the guide elements for the ribbon, so that the frame holding the printer and the case enclosing it can be of a minimum width for a particular paper width.

SUMMARY OF THE INVENTION

The improvement provided by this invention utilizes a ribbon guide which is moveable with the registration element of the printhead and shaped to guide the path of the ribbon spanning the width of the chart so that the guide positively positions a selected color band of the ribbon under the registration element of the printhead for printing the selected color as the printhead traverses the paper. To accommodate the movement of the ribbon and movement of the printhead, the ribbon cartridge is pivotally mounted so that it is free to pivot about an axis above the line of traverse of the printhead and parallel to a plane between the line of traverse of the printhead and the surface of the paper.

BRIEF DESCRIPTION OF THE DRAWINGS

In the drawings, where like reference characters identify like elements:

FIG. 1 is a perspective drawing of a strip chart recorder incorporating the present invention.

FIG. 2 is a partial perspective drawing showing one end of a ribbon supply cartridge of the type useful in this invention.

FIG. 6 is a cross section of the hub of the ribbon guide support.

DESCRIPTION OF THE PREFERRED EMBODIMENTS

Figure 3:
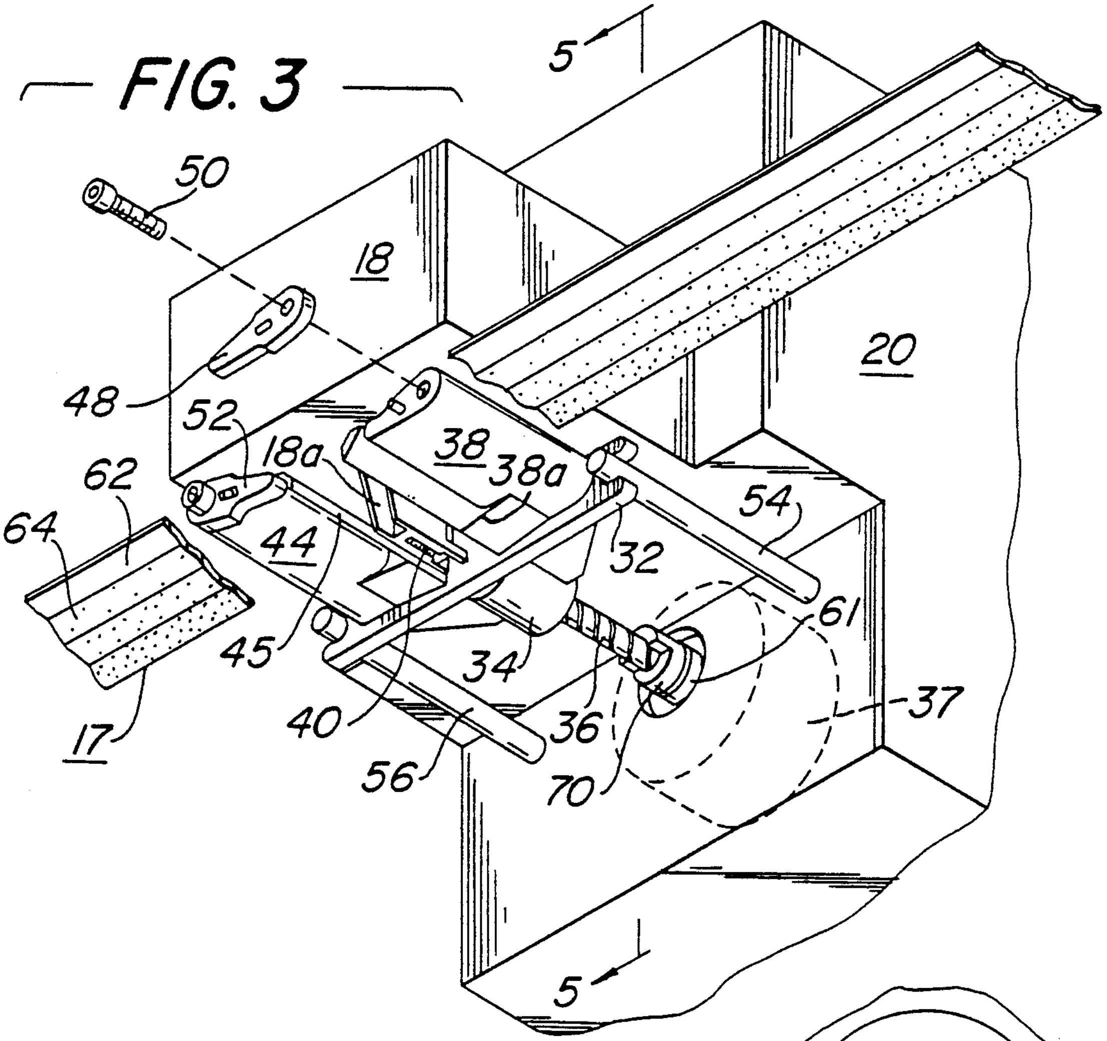
FIG. 3 is a perspective drawing showing the relationship of the ribbon guide and the impact elements of the printhead.

In FIG. 1 there is shown a strip chart recorder of the type with which this invention is concerned. The recorder is shown supported by a frame 10, which pivotally supports a ribbon cartridge 12 whose ribbon is driven through a path across the chart 16 by motor 13. The ribbon cartridge has its stuffing box 12*a* mounted parallel to and above the chart drive roll 14 and has ribbon guiding arms 15 extending from the stuffing box to guide the multicolor ribbon 17 across the chart in a plane parallel and adjacent to the chart as it goes over the drive roll 14.

The chart drive roll drives chart 16 past the line of traverse across the chart of the wire matrix elements 18*a* (FIGS. 3 and 4) of a dot matrix printhead 18 so as to establish one of the dimensions of the chart record, time, for example, along the length of the chart. The printhead traverses the width of the chart to establish for the other dimension of the chart record, a variable such as temperature or voltage.

The printhead is carried across the chart by a carriage 20 which is supported and guided by two rails 22 and driven by a capstan 23 through drive cable 24 whose path is determined by idler pulleys 25. As the printhead traverses the chart, the ribbon is guided past the printhead by a ribbon guide which is associated with the printhead and moves across the chart with it.

In FIG. 2, which is a blowup isolating one end of the ribbon cartridge 12, that cartridge is shown as having a pivot pin 32 at each end to support the cartridge between the side portions of the frame 10 so that the cartridge is free to pivot as indicated by the arrows. The cartridge is shown with ribbon guiding arms such as 15 which guide the ribbon through a normal plane between the arms 15 and adjacent to and parallel to the paper at the top of the chart drive roll. It will be noted that the guide arms have edge guiding surfaces to keep the ribbon from going off of the arms. These surfaces at the same time will cause the cartridge to pivot when the ribbon is moved either away from the carriage or toward the carriage. That movement will serve to move different color bands of the ribbon under the printhead wire matrix depending on the position of the guide.

In the present invention, the color to be used for recording is selected by a stepwise positioning of the ribbon guide from a home position, in which the guide is positioned a few steps away from the position which would bring it up against a stop. The guide can be in the home position for the first traverse by the printhead to record in a first color. Then the guide can be stepped further away from the stop for whatever are the required number of steps to bring the registration elements making up the wire matrix opposite the next color band. The printhead can then traverse the chart in the opposite direction to record the second color. Similarly, the guide may be stepped further by the required number of steps to bring the registration elements opposite the third color band so that data can be recorded in that color in the next traverse of the printhead, and so forth until all of the data has been recorded in the appropriate colors as originally determined by the drive circuitry for the carriage and the printhead.

The ribbon may be advanced through its path by the ribbon drive motor 13 at any selected time. Thus, for example, the motor 13 can advance the ribbon between printhead traverses to present to the printhead a completely different length of ribbon for each traverse, or the ribbon may be moved with the printhead in one traverse and be stationary during the next traverse.

FIG. 3 is a perspective view of the underside of the printhead and ribbon guide showing the details of the ribbon guide and the associated structure for moving the ribbon guide toward and away from the carriage body. The ribbon guide consists of a guide support means in the form of plate 32 which is molded as part of the ribbon guide and has a central hub 34 constructed to be driven by the lead screw 36 from a stepping motor 37 (shown in phantom) located in the carriage structure 20. The plate 32 carries a first guide element 38 which is located outboard from the wire matrix 40, shown located in housing 18*a* of printhead 18. The ribbon 17 is supported by the top surface of element 38, as may be more easily seen in connection with FIG. 4. After the ribbon leaves the surface of guide element 38, it is guided by the surface of an inboard guide element 42, which is above the ribbon and is therefore effective to change the plane of the ribbon from the normal plane it is in as it leaves the cartridge guiding arms 15 to a parallel plane just below and generally in contact with the lower surface of the wire matrix 40.

Corresponding outboard and inboard guide elements 44 and 45 are carried by the plate 32 on the other side of the wire matrix from elements 38 and 42 and are operative to guide the ribbon between the plane below the wire matrix and the normal plane of the ribbon. Thus, as the wire matrix is moved from one side of the chart to the other, the ribbon will slip over the ribbon guides so that the ribbon is brought from its normal plane to the plane below the wire matrix and thence back to the normal plane as the carriage proceeds in its traverse. During the traverse the wires are fired for printing at positions determined by the circuits controlling the firing of the wires.

In order to maintain the ribbon in the slot between the outboard and inboard guides, there is mounted across the end of each of those slots a ribbon retaining plate such as plate 48, which is shown exploded away from the guide elements for purposes of clarity. The plate 48 is mounted on element 38 by a machine screw 50 which may be loosened when it is necessary to extract the ribbon from the slot between 38 and 42 to change the ribbon. A similar retaining plate 52 is shown in its normal operating position wherein it closes the gap between guide elements 44 and 45. In order to prevent any open spaces developing between the guide elements and the retaining plate, the inboard guide elements are made slightly longer than the outboard elements. It then can be assured that the retaining plate will be in contact with the inboard element by orienting the plates so that any bow that happens to exist in the plates is facing the slot between the inboard and outboard guide elements.

The wire matrix 40 is, of course, fixedly mounted to the carriage 20 since it is part of the printhead 18. In order to use the wire matrix to print on the chart in different colors, the ribbon 17 is moved toward and away from the carriage 20 in sequential steps by the stepping motor 37. It will usually take a fixed number of steps of the motor to move the ribbon a distance corresponding to the width of a color band. Thus, after each carriage traverse for recording a particular color on the chart, it will be necessary to position the matrix opposite the next color band so that recording may be done with the next band on the next recording traverse of the chart. As the carriage traverse the chart, or as the ribbon is advanced by driving motor 13, the ribbon and the ribbon guide will move relative to each other. In that movement one edge of the ribbon is guided by the retaining plates covering the respective slots between the inboard and outboard elements and the other edge is guided by an edge 38a formed between the inboard and outboard elements by the material which closes the slots at the end where the guide elements are adjacent the plate 32.

Figure 5:
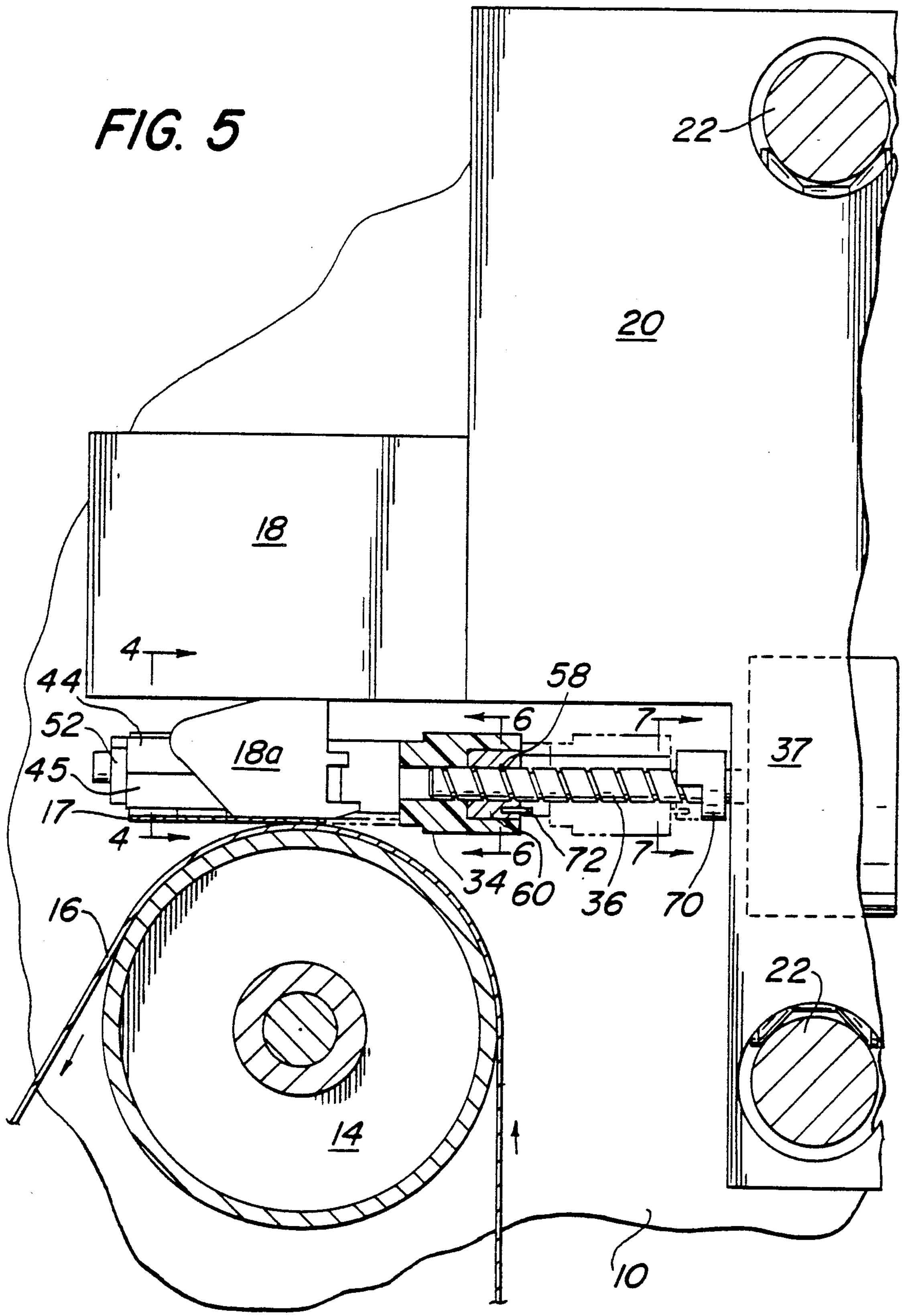
FIG. 5 is a side elevation taken along the line 5—5 in FIG. 3.

In order that the ribbon guides may be moved toward or away from the carriage, the plate 32 is guided by the parallel pins 54 and 56 which project from carriage 20 and which are in frictional engagement with slots formed in each end of the plate 32. The ribbon guides are stepped by rotation of the lead screw 36 which engages the hub 34 of plate 32. The manner of engagement between the hub 34 and the lead screw is illustrated in FIG. 5, wherein it is shown how the lead screw is inserted axially into the hub 34 with the spiral groove of the lead screw engaging a pin 58 which is located transversely at an angle to match that of the lead screw in the center hole of the hub. As is more clearly shown in FIG. 6, the pin is fixed in insert 60 which is fixedly mounted in the hub 34, as shown.

Figure 4:
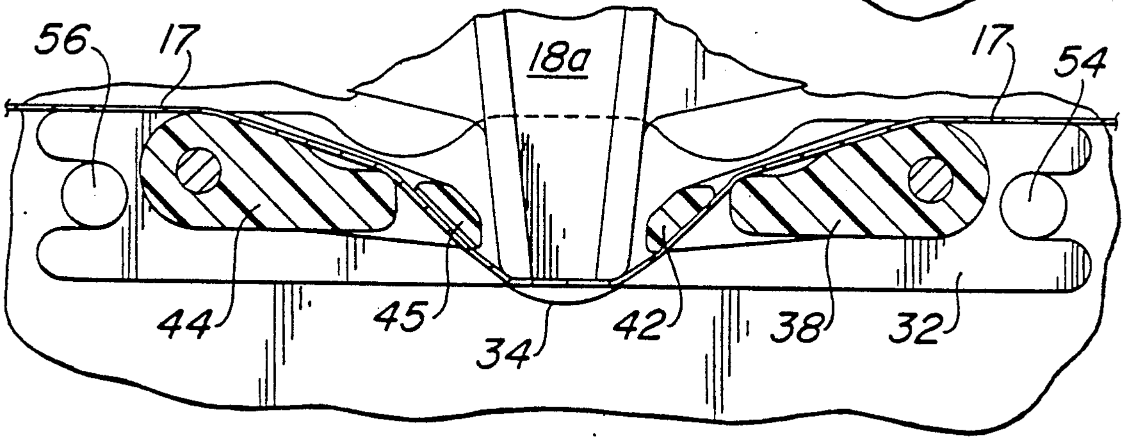
FIG. 4 is a front elevation, partially in cross-section taken along the line 4—4 in FIG. 5.

In FIG. 4 there is shown the view taken in the direction 4—4 shown in FIG. 5. In this view the guide elements are shown to scale in order that the shape of the surfaces of those elements may be seen. As is evident, the top surface of the guide element 38 has that portion nearest the printhead 18 contoured to be concave to the ribbon, whereas the other portion away from the printhead is substantially flat except for the convex edge which leads the ribbon onto the guide surface. FIG. 4 illustrates how the ribbon 17 is supported by the outboard elements 38 and 44 and is moved into the appropriate plane below the printhead 18 by the inboard guide elements 42 and 45 which present a substantially flat surface to the ribbon.

Figure 7:
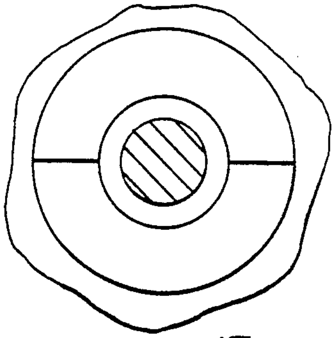
FIG. 7 is a drawing taken along the line 7—7 in FIG. 3 showing the stop arrangement for the ribbon guide.

Referring to FIG. 3, in the system of the present invention the home position is that defined by the driving of the lead screw 36 to bring the hub 34 against a stop and then stepping the lead screw back a predetermined number of steps, as determined by a calibration procedure, so that the color band 62 of the ribbon is positioned under the wire matrix. The stop provided for the ribbon guide as it approaches the carriage is formed by the combination of a split face collar 70 (shown in front elevation in FIG. 7, in side elevation in FIG. 5 and in perspective in FIG. 3) and the pin 72 (shown in FIGS. 5 and 6) which is driven against the radial face of the split face collar to stop the motor 37. The split face collar is welded to the lead screw 36, and the pin 72 is positioned in insert 60 parallel to its axis, as shown in FIGS. 5 and 6.

When the period for printing in the color of band 62 arrives, the carriage 20 is transported, as by means of a stepping motor, across the chart width and the appropriate wires are fired at each of its step positions without stopping the carriage. The ribbon guide is then stepped away from the home position so that the color of the ribbon band 64 is positioned under the wire matrix. The carriage is then transported across the chart to return to its original position. As previously stated, the ribbon may be advanced between the traverses of the carriage by stepping the ribbon drive motor 13 (FIG. 1). With the four color bands shown in the drawings, the ribbon guide would then go through the positioning steps necessary to change the color band for the next two traverses. At that point all of the data, that is the data to be printed in each of the colors, would have been printed and the ribbon guide can be returned to its home position.

The calibration required to establish the home position which will give proper registration between the ribbon color bands and the wire matrix may be carried out by a number of different procedures. One of these procedures, which has been found to be useful is carried out by adjusting the number of steps by which the guide is driven away from its stop to get to the home position. One way of determining that number of steps is to run a calibration adjustment in which one adjusts the number of steps away from the stop which are necessary to have all wires printing one color except for a wire located at one extreme of the matrix. With that calibration adjustment the software of the drive circuit for the stepping motor which drives the guide can determine the proper number of steps away from the stop that should be taken in driving to the home position.

The details of a method by which dot matrix printing can be accomplished is shown in U.S. patent application Ser. No. 326,142, filed by Michael D. Carney on Mar. 20, 1989 and assigned to the assignee of the present application.

It will be evident to those skilled in the art that one may use the present invention in thermal printing systems wherein thermal elements are the registration elements which operate through special thermal ribbons to print multicolor records. In such systems the thermal ribbon may be moved by a ribbon guide similar to that described above.

What is claimed is:

1. In a printer having a registration element, which is selectively driven in traverse of a paper to be printed on over a line parallel to the paper; a ribbon having a plurality of parallel color bands, which ribbon is carried by a cartridge providing a supply of ribbon; and means for transporting the ribbon through a plane between a line of traverse of the element and a surface of the paper; the improvement which comprises:

a ribbon guide mounted so that said ribbon guide traverses the paper with said registration element, said ribbon guide having guiding surfaces positioned on each side of the registration element and close to said registration element, said guiding surfaces being shaped to guide the ribbon on a path which extends across the paper so that said ribbon will pass between the registration element and the paper, a stepping motor mounted on said carriage for moving said ribbon guide in a direction normal to the line of traverse of the registration element and parallel to said plane so as to selectively position color bands of the ribbon under the registration element so that a selected color can be printed at selected positions across the paper as the registration element is driven in traverse of the paper; and means for pivotally mounting said ribbon cartridge so that said ribbon cartridge is free to pivot about an axis above the line of traverse of the registration element whereby said ribbon is free to move in response to displacement of the ribbon by said movement of the ribbon guide in selection of the color band.

2. Apparatus as set forth in claim 1 in which the stepping motor moves the ribbon guide in steps by means of a lead screw which engages the guide in driving relationship so that particular color bands may be selected by the number of steps the motor is driven.

3. Apparatus as set forth in claim 1 in which a plurality of registration elements are provided in a matrix supported in a printhead which is mounted to a carriage for traverse of the paper.

4. Apparatus as set forth in claim 3 in which the printhead is a dot-matrix printhead having a line of wires as registration elements and means for firing said wires axially so that said elements will print by impact through the ribbon to the paper.

5. In a printer having a registration element, which is selectively driven in traverse of a paper to be printed on over a line parallel to the paper; a ribbon having a plurality of parallel color bands, which ribbon is carried by a cartridge providing a supply of ribbon; and means for transporting the ribbon through a plane between a line of traverse of the element and a surface of the paper; the improvement which comprises:

a ribbon guide mounted so that said ribbon guide moves across the paper with said registration element, said ribbon guide including a support means, two pairs of guides elements, each pair supported by said support means on opposite sides of said registration element to provide pairs of guiding surfaces which are mirror images of each other for guiding said ribbon from said ribbon's normal transport plane to a plane between the registration element and the paper, each of said pairs having a first guide element supported to extend from said support means in an outboard position and having a guiding surface below and in supporting contact with said ribbon, another guide element supported to extend from said support means by a distance slightly different from the extension of said first guide element and parallel to said first guide element in a position inboard to said first guide element so as to form with said outboard element a ribbon guiding slot, said inboard element having a guiding surface positioned above said ribbon, and a ribbon retaining plate mounted over ends of said guide elements by means of a screw threaded into an end of that one of said guide elements which extends a least distance from said support means so as to hold one surface of the plate firmly against the end of said one guide element to close said slot to retain said ribbon therein as the ribbon moves through the slot, said plate being mounted so that any concavity in the plate surface is facing the slot in order to cause the slot to be securely closed despite nonplanar surfaces which may exist in the retaining plate;

a stepping motor mounted on said carriage for moving said ribbon guide in a number of steps by means of a lead screw which engages the support means in driving relationship, said movement of the guide being in a direction normal to the line of traverse of the registration element and parallel to the said plane so that particular color bands of the ribbon may be positioned under the registration element by selecting the number of steps the motor is driven; and means for pivotally mounting said ribbon cartridge so that said ribbon cartridge is free to pivot about an axis above the line of traverse of the registration element whereby said ribbon is free to move as the ribbon is displaced by said movement of the ribbon guide in selection of the color band.

6. Apparatus as set forth in claim 5 in which a portion of the guiding surface of said outboard guiding elements is concave to the ribbon.

7. In a printer having a registration element, which is selectively driven in traverse of a paper to be printed on over a line parallel to the paper; a ribbon having a plurality of parallel color bands, which ribbon is carried by a cartridge providing a supply of ribbon; and means for transporting the ribbon through a plane between a line of traverse of the element and a surface of the paper; the improvement which comprises:

a ribbon guide mounted so that said ribbon guide moves across the paper with said registration element, said ribbon guide having guiding surfaces positioned on each side of the registration element and close to said registration element, said guiding surfaces being shaped to guide the ribbon on a path which extends across the paper between the registration element and the paper;

a stepping motor mounted on said carriage for moving said ribbon guide in a number of steps by means of a lead screw which engages the guide in driving relationship, said movement being in a direction normal to the line of traverse of the registration element and parallel to the said plane so as to selectively position particular color bands of the ribbon under the registration element by selecting the number of steps the motor is driven, one extreme of travel of the ribbon guide being determined by a stop which includes a split face collar fixed to said lead screw, and a pin projecting from the ribbon guide parallel to the axis of generation of the lead screw so that said pin will engage a radial face of said collar when the ribbon guide is at a stop position which defines a home position in that the home position is a known number of steps away from the stop position, the home position being the position in which the registration element is in printing registration with a color band at an edge of the ribbon so that by consecutive stepping of the stepping motor the ribbon guide moves from the home position in a direction away from the stop and the element is brought consecutively in register with corresponding consecutive color bands located across a width of the ribbon; and means for pivotally mounting said ribbon cartridge so that said ribbon cartridge is free to pivot about an axis above the line of traverse of the registration element whereby said ribbon is free to move as the ribbon is displaced by said movement of the ribbon guide in selection of the color band.

* * * * *